June 10, 1969  W. F. TAYLOR ET AL  3,449,099
PROCESS FOR REACTING HYDROCARBONS AND STEAM USING
SPENT CATALYST FOR PRETREATING
Filed Feb. 10, 1964  Sheet _1_ of 2

William F. Taylor
John H. Sinfelt    Inventors
Henry Berk

By  *Henry Berk*  Patent Attorney

William F. Taylor
John H. Sinfelt
Henry Berk

Inventors

By  *Henry Berk*  Patent Attorney 3,449,099
PROCESS FOR REACTING HYDROCARBONS AND STEAM USING SPENT CATALYST FOR PRETREATING
William F. Taylor, Scotch Plains, John H. Sinfelt, Berkeley Heights, and Henry Berk, Westfield, N.J., assignors to Esso Research and Engineering Company, a corporation of Delaware
Filed Feb. 10, 1964, Ser. No. 343,538
Int. Cl. C10g 35/06
U.S. Cl. 48—214     2 Claims

ABSTRACT OF THE DISCLOSURE

In producing gases containing methane, hydrogen, and carbon dioxide by reaction of paraffin hydrocarbons with steam in the presence of a highly active catalyst containing nickel interspersed with alumina or silica to give the catalyst a nickel surface area of about 20 to 60 m.$^2$/g. of catalyst when freshly prepared and activated by treatment with hydrogen, the hydrocarbon feed-steam mixture is first passed through a bed of said catalyst which has been deactivated by use in said reaction but retains residual nickel surface area for removing sulfiding and coking contaminants from the reactant mixture before the reactant mixture is passed through a bed of the freshly prepared and activated catalyst under reaction conditions for producing the desired gas products.

---

This invention relates to reactions of naphtha hydrocarbons with steam in the presence of high activity catalysts, which at relatively low reaction temperatures, promote the formation of gaseous products containing mainly methane, carbon dioxide, and hydrogen. This invention is more particularly concerned with preconditioning the naphtha hydrocarbon-steam feed mixture to improve the activity and activity maintenance of the catalyst by treatment of the feed mixture with the same kind of catalyst in a spent condition.

The high-activity catalysts have high nickel-surface areas, e.g. 20 to 60 square meters per gram. Relatively low reaction temperatures, e.g. in the range of 550° to 900° F., are used to promote the desired reactions and to maintain the activity of the catalyst. The desired gaseous products obtained are rich in methane (over 50% of total CH$_4$, CO$_2$, and H$_2$) when the catalyst activity and residence period are sufficient for above 80% conversion of the naphtha hydrocarbons. The gaseous products can be obtained richer in hydrogen at lower conversion levels, below 40%.

High-activity catalysts suitable for the intended reactions were developed prior to the present invention, but their use presents problems in prolonging their activity or usefulness, particularly with regard to deactivating factors such as sintering, oxidation of the nickel, coke deposition, and poisoning by sulfur.

In accordance with the present invention, spent catalyst obtained from the high-activity catalysts employed for the reactions mentioned have been found to be useful if properly handled for pretreating the naphtha hydrocarbon feeds as they are passed to a bed of high-activity catalyst in the main reaction zone. The spent catalysts having residual activity, which is related to their residual absorptive nickel surface areas, have the capabilities of forming hydrogen when contacted by the naphtha-steam mixture at temperatures approaching those required in the main reaction zone and of picking up sulfur-contaminants from the naphtha feed. With these capabilities there are other beneficial effects obtained in the pretreatment of the naphtha-steam feed toward lessening deactivation of the highly active catalyst in the main reaction zone.

Foremost among the high-activity catalysts for the reactions specified are those containing 40 to 60 wt. percent Ni interspersed with 60 to 40 wt. percent alumina or silica and having an admixed promoter metal, such as Ba, Sr, Cs, La, Ce, Y, Fe, K, or Ca present as oxide, carbonate, or both. Catalysts of this kind have been found able to convert more than 90% of paraffins present in light naphthas, e.g. n-pentane, n-hexane, etc., to a gas product containing well over 50% CH$_4$ with lesser amounts of CO$_2$ and H$_2$ in runs lasting 500 to more than 1000 hours before they become spent to the extent that the product quality (e.g. B.t.u. value or CH$_4$ content) becomes unsatisfactory. It is at this point that the catalyst cannot be employed further to obtain the desired conversion even if the reaction conditions are changed, as by increase of the reaction temperature or lowered space velocity. These highly active catalysts are essentially used at temperatures as low as practical, e.g. 550° to 850° F., to form the desired products at a suitable rate with slowest possible decline in activity. As the activity of the catalyst declines at a fixed feed rate, it is compensated for by increasing the temperature periodically, e.g. 5° F. per 50 hours, until finally the activity decline is accelerated at elevated temperatures approaching and above 900° F.

Although there is no definite and complete explanation of the catalyst deactivation mechanism, a number of factors appear to contribute to the deactivation. Coke formation takes place more readily at higher temperatures, and has been found to occur preferentially in the front end of the catalyst bed. An insufficient concentration of steam or hydrogen at particular sites of the catalyst possibly contributes. Also, hydrogen or hydrocarbon reactant might not be present in sufficient amount to offset oxidation by steam. Sulfur poisoning results from sulfiding of nickel catalyst surface and it has not been found that repeated hydrogen treating effectively restores the high activity or activity maintenance of the catalyst.

In this invention, the naphtha-steam feed mixture is pretreated by passing it through a bed of the spent catalyst protected against oxidation by air so that it retains some active nickel surface area, e.g. above 5 m.$^2$/g., before the feed mixture enters the main catalyst bed. This pretreatment improves the condition of the feed mixture to minimize deactivation of the highly active catalyst in the main catalyst bed where the desired main reactions take place.

The method of operation as demonstrated will be described with reference to the drawings.

FIGURE 1 in the drawing shows in vertical cross-section a reactor loaded with a spent catalyst above a main bed of highly active catalyst for downflow of the feed mixture to be pretreated by contact with the spent catalyst, then reacted on passing through the main bed of highly active catalyst.

Other modifications of the apparatus shown will be apparent.

Figure 1:
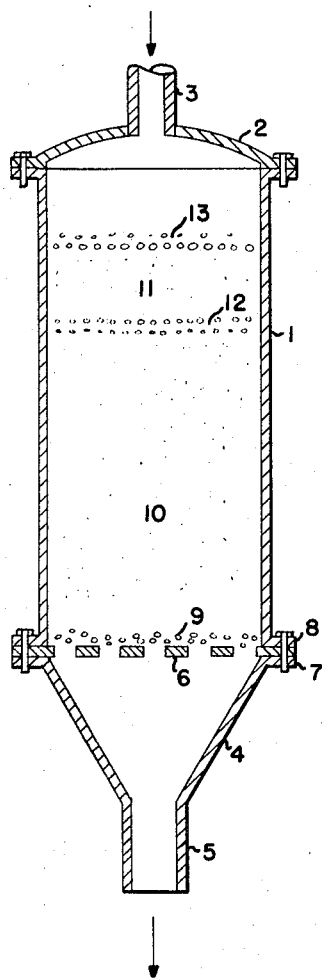

In FIGURE 1, the cylindrical reactor or reaction vessel 1 constructed of heat and chemical resistant material, such as steel, has top cover 2 provided with an inlet 3 for a mixture of naphtha vapor and steam. The cover 2 is bolted with a gas tight fit to the top of vessel 1. At the bottom of vessel 1 is a gas tight attachment of a conical or funnel shaped conduit 4 having an outlet 5 for removal of gaseous products. A perforated plate 6 is bolted between a flange 7 at the wider end of funnel 4 and bottom flange 8 of vessel 1. The perforated plate 6 supports above it ceramic balls 9, the main bed of highly active catalyst, and the superimposed bed 11 of spent catalyst. The bed 11 of spent catalyst may be partitioned from the main bed 10 by a layer of ceramic balls 12 and has a top layer 13 of ceramic balls to aid in distributing the gaseous mixture as it flows downwardly, first into bed 11 for preconditioning, then through main bed 10 where the main desired reactions are obtained.

In the operation of the single vessel reaction shown in FIGURE 1, the naphtha-steam mixture from a naphtha preheater and steam generator, not shown, enter by inlet 3 to flow first through the spent catalyst bed 11 where reaction is initiated to form some hydrogen, mixing of the hydrogen formed with the hydrocarbons and steam is obtained, and some sulfur from sulfur contaminants is taken up by the nickel. The resulting mixture of naphtha-steam, and hydrogen with small amounts of other decomposition products, e.g. $CO_2$, $CO$, and $CH_4$, then enters the upper part of catalyst bed 10 for the main reaction effected by contact with the highly active catalyst. The gaseous products leave the bottom part of the bed 10 by passing through the layer of ceramic balls, through the perforation of plate 6, then out through the outlet 5 for recovery.

The pretreatment zone may be in a separate vessel upstream from the vessel containing the main bed of catalyst, and means may be used for switching from one pretreatment vessel containing fouled spent catalyst to another containing fresh spent catalyst, because in time the spent catalyst undergoes further deactivation, e.g. by coke deposits, sulfiding, so that it loses its effectiveness.

Figure 2:
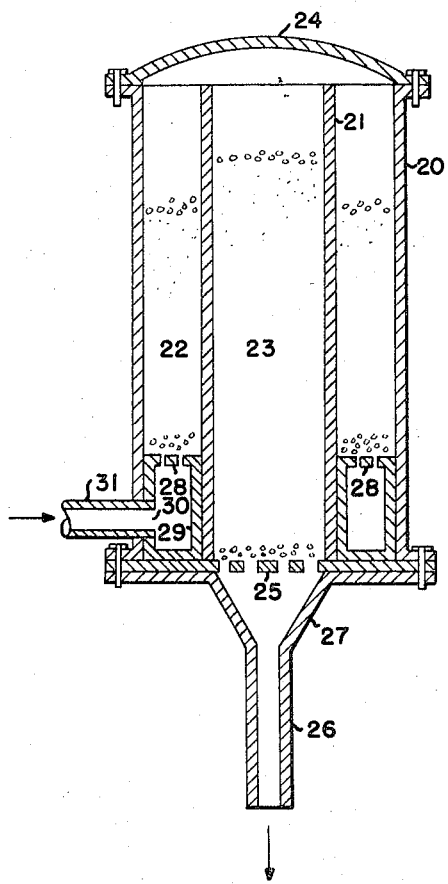
FIGURE 2 shows schematically in vertical cross-section a reaction vessel in which the feed mixture is made to flow up through a spent catalyst for preconditioning in a chamber adjacent to a chamber holding the main bed of highly active catalyst contacted by the preconditioned feed mixture.

In FIGURE 2 the outer cylindrical shell 20 of the reaction vessel is concentric with an inner cylindrical partition 21 to divide the vessel into two chambers. The pretreatment zone is in the spent catalyst bed 22 occupying annular space between shell 20 and cylinder 21. The main reaction zone catalyst bed 23 is in the central space within the cylinder 21. The vessel 20 has a detachable cover 24 which is gas tight when affixed by bolts or clamps. Catalyst bed 23 is supported above the perforated plate 25, which permits outflow of gaseous products from the bottom of bed 23 to the outlet passage 26 of the funnel shaped bottom closure 27 of the vessel. The spent catalyst bed 22 for preconditioning feed is supported on a perforated disc 28 which is the top of an annular unit 29 that fits into the annular space around a bottom portion of cylinder 21 and has an inlet 30 for entrance of the feed from an inlet pipe 31 near the bottom of shell 20. The internal unit 29 can be removed to discharge the fouled spent catalyst when the closure 27 and perforated plate 25 are detached from the bottom of the vessel after spent catalyst is discharged from bed 23.

The operation of the apparatus shown in FIGURE 2 comprises passing the feed mixture up through the preconditioning spent catalyst bed 22, then down through the main catalyst bed 23. The feed mixture of naphtha-steam enters the bed 22 at a lower temperature than the exit temperature of products from bed 23 when exothermic heat is evolved near the bottom of bed 23, as in the methanation reaction which converts CO by reaction with $H_2$ to $CH_4$, e.g. at temperatures that rise above 750° F., so that the upflowing feed entering bed 22 at lower temperatures, e.g. 550° to 700° F., can absorb heat by indirect heat exchange. The feed mixture flowing up through the preconditioning spent catalyst bed 22 undergoes mixing with some turbulence while it undergoes changes by forming some $H_2$, with removal of sulfur and partial elimination of hydrocarbons that form coke deposits.

When the catalyst of the main bed 23 becomes spent, say after 3 to 4 months running, the reactor is permitted to become cooled and the spent catalyst is removed with care to avoid oxidation of residual active nickel in recovering this catalyst for use in the next preconditioning operation. The spent catalyst recovered for this next use may be a portion of the bed 23, e.g. bottom two-thirds, which remains less sulfided. Oxidation of the spent catalyst may be minimized by using means for preventing its exposure to air, as by use of gas blanketing, e.g. by inert gas $N_2$, $N_2$ with $CO_2$, $H_2$, or inert hydrocarbon. A vacuum means for withdrawing catalyst may be used.

Figure 3:
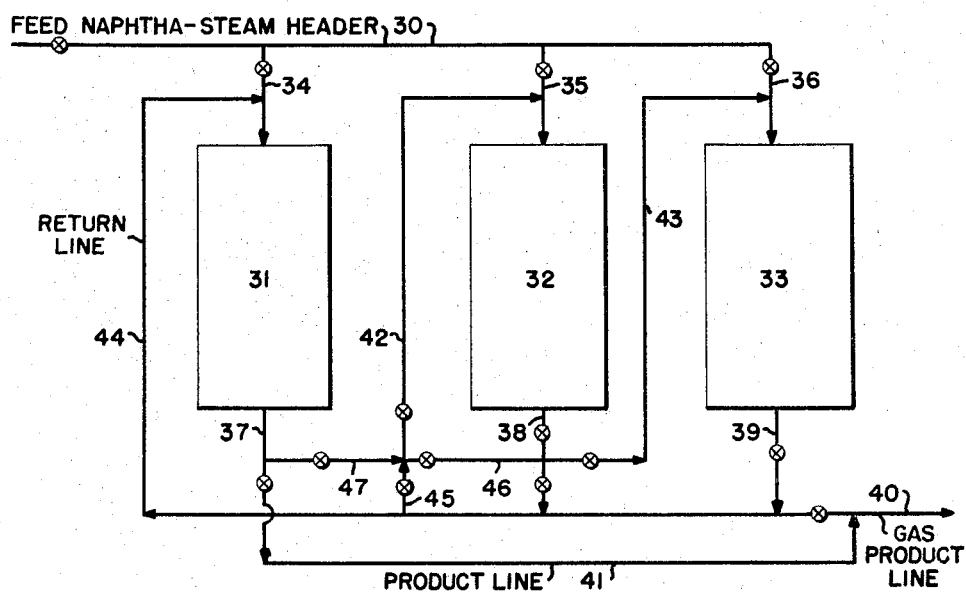
FIGURE 3 shows diagrammatically an arrangement of a plurality of reaction vessels having a valved manifold feed line to pass the feed into one of the vessels containing spent catalyst so that the feed is preconditioned before it is passed to an interconnected reaction vessel containing highly active catalyst.

In the arrangement of interconnected vessels shown in FIGURE 3, the feed mixture of hydrocarbon with steam can be passed from a manifold line or header 30 through a valved inlet line into any one of the vessels 31, 32 or 33 containing spent catalyst as formed in a previous run. The vessels have valved inlet lines 34, 35 and 36, and each vessel has a valved outlet line 37, 38 and 39. Said outlet lines have a valved connection to a product receiving line 40, such as the valved line 41 from the outlet 37 of vessel 31.

Each of the vessels 31, 32 and 33 has a connection for flowing preconditioned hydrocarbon-steam mixture into another of the reactors containing active catalyst for the main reaction. For example, with the valve closed in the extension of outlet 37 into line 41 from vessel 31, the valves in lines 47 and 42 may be open for passing preconditioned feed mixture from the outlet of vessel 31 to the inlet line 35 of vessel 32 when vessel 32 is used as the main reactor. Using vessel 32 as the main reactor, the product is led through line 38 into the product outlet line 40. During such a period vessel 33 could be offstream and prepared for use as the main reaction vessel by being charged with fresh active catalyst so that subsequently preconditioned mixture from vessel 32 can be sent into vessel 33 through line 43, the fresh feed mixture for preconditioning entering vessel 32 from the inlet 35 from header 30. In a subsequent cycle, the fresh mixture would enter vessel 33 from line 36 to be preconditioned by contact with the spent catalyst in vessel 33, then the preconditioned feed mixture can be passed through line 44 to flow through active catalyst in vessel 31, charged with the fresh catalyst. Here vessels 31 and 33 are in operation simultaneously. The product leaving vessel 31 can be passed through line 41 to the product outlet line 40.

By having the spent catalyst remain in separate vessels employed as shown in FIGURE 3, it is possible to protect the catalyst after it has been spent for the main reaction until it is used for the preconditioning reaction.

It is possible to have the preconditioning take place in a portion of the spent catalyst bed most suitable in any of the reactors used for the preconditioning.

With the additional valved lines 45 and 46, two of the vessels containing spent catalyst can be used for preconditioning alternately during different parts of a run to supply a preconditioned feed to another vessel holding the active catalyst for the main reactions. Thus, while one of the vessels serves as a main reactor for a period of say 3 to 4 months, one of the other vessels is used for preconditioning for a period of one month, then is replaced in this task by another vessel containing spent catalyst for a period of a month.

The battery of vessels may have other control equipment, not shown, including lines for supplying hydrogen used for activating fresh catalyst charged to a reactor.

Demonstrations of how the present procedure obtains improved results are given in the following examples.

Example 1

In a process of converting a light naphtha of principally $C_5$ to $C_8$ paraffins to a gas rich in hydrogen, a highly active nickel-silica catalyst was used at reaction temperatures mainly in the range of 600° to 800° F. with steam of 150 to 500 p.s.i.g. pressure and high space velocities, e.g. 20 to 100 lbs. hydrocarbon feed per lb. of catalyst per hour, the steam being admixed in a proportion of 2 to 4 lbs. per lb. of hydrocarbon.

The nickel-silica catalysts of high activity have above 20 m.²/g. Ni surface area and by special methods of preparation were made to contain up to about 60 m.²/g. Ni surface area with a total surface area in the range of 150 to 300 m.²/g. These special method catalysts were made by coprecipitating nickel with sodium metasilicate in the presence of kieselguhr by addition of $NH_4HCO_3$, washing the precipitate to remove sodium ions, drying the washed precipitate at 200° to 400° F., calcining the dried precipitate in air at 600° to 750° F., then activating the calcined catalyst with $H_2$ at 700° F. when ready for use. The high-activity Ni-$SiO_2$ catalysts contained from 20 to 90 wt. percent $SiO_2$ total and preferably 25 to 50 wt. percent Ni. This kind of catalyst, termed a coprecipitated catalyst, functions much better than a catalyst made with larger amounts of nickel precipitated onto kieselguhr but not having an interspersion of silica from coprecipitated silicate.

The highly active nickel-silca catalysts were tested and found to be able to remain active for long periods in the naphtha-steam reaction, but to lose activity with loss of nickel surface area. Although sulfur poisioning is a factor in deactivation it is not the only one, but even when the feed hydrocarbons contain as little as 1 p.p.m. S, the catalysts pick up sulfur.

The following tabulated data are indicative of how sulfur picked up by the catalyst becomes distributed in the bed.

TABLE I

Ni-$SiO_2$ catalyst used in run for 171 hours at 700° F., 500 p.s.i.g., 2 lbs $H_2O$/lb. hexane feed 1.5 p.p.m. in feed during initial 71 hours; 20 p.p.m. S in feed during 71–131 hours

| | Wt. percent S on catalyst |
|---|---|
| Fresh (average) | 0.09 |
| Inlet ⅓ of bed | 0.64 |
| Middle ⅓ of bed | 0.25 |
| Exit ⅓ of bed | 0.13 |
| Average of bed after use | 0.32 |

S removed by catalyst from feed 60%.

On the same basis, by using spent catalyst located on top the fresh catalyst in a downflow reactor, the spent catalyst holding 0.13 wt percent S and being present in a proportion of ⅓ the fresh catalyst in the main reaction bed, the spent catalyst used for preconditioning the feed is capable of picking up nearly 45% of the sulfur to give the following distribution.

TABLE II

Same conditions as in Table I pretreatment zone containing spent catalyst equivalent in amount to ⅓ fresh catalyst

| | Wt. percent on catalyst |
|---|---|
| Spent catalyst (initial) | 0.13 |
| Spent catalyst (final) | 0.68 |
| Inlet ⅓ main bed | 0.24 |
| Middle ⅓ main bed | 0.13 |
| Exit ⅓ main bed | 0.10 |

| | Percent |
|---|---|
| S removed by spent catalyst | 45 |
| S removed by main bed catalyst | 15 |
| Total sulfur removed by all catalyst | 60 |

Experiments with spent catalyst dumped from extended runs at 700° F. and 500 p.s.i.g. using 2 lbs. $H_2O$/lb. hydrocarbon feed indicated that preferred operating temperature range for sulfur removal is about 400° F. to 700° F., and that temperatures slightly below the active catalyst inlet temperature are very efficient for sulfur removal. This is unexpected since the maximum capacity for sulfur removal would be expected to exist at lower temperatures.

TABLE III.—SPENT NICKEL-ALUMINA-PROMOTER CATALYST HEXANE FEED, AVG. 2.8 LB. $H_2O$/LB. HC, ATMOSPHERIC PRESSURE

| | | Wt. percent sulfur | | | |
|---|---|---|---|---|---|
| W./hr./w. | Temperature (° F.) | In hexane feed | In hexane product | Initially on catalyst | Finally on catalyst |
| 13.5 | ¹345 | .09 | .08 | .16 | .39 |
| 23.3 | ¹400 | .09 | .04 | .16 | 2.36 |
| 23.0 | ²680 | .11 | .04 | .16 | 2.18 |

¹ 2 hour run.
² 1 hour run.

A comparison made of runs with 25 p.p.m. S in the naphtha feed and 2 to 3 p.p.m. S in the naphtha feed clearly showed that the activity of the active catalyst is maintained at a level more than 25% higher with respect to the rate of gas production in cu. ft. per hour.

It will be appreciated that removal of sulfur from the feed by hydrofining permits the feed to have a low sulfur content down to below 3 p.p.m. but with much more cost as such low trace amounts are removed. Therefore, it is advantageous to use the pretreatment for sulfur removal by spent catalyst which has the additional effects of lowered carbon deposits and less deactivation of the active catalysts.

Studies of deactivation factors on outstanding promoted nickel-alumina catalysts were made. These catalysts were obtained by coprecipitating hydroxides, carbonates, and basic carbonates of nickel and aluminum from aqueous solutions of the nitrate salts using $NH_4HCO_3$ as the precipitating agent at 32° to about 212° F., admixing promoters as hydroxides or nitrates, drying at 200° to 400° F., calcining in air the dried solids at 600° to 750° F., then activating by reducing the nickel oxide with $H_2$ at 600° to 800° F. The amount of promoter, e.g. K and Ba, was in the range of 1 to 6 wt. percent. These catalysts were found capable of giving about 90% conversion of n-hexane for over 500 hours without raising the reaction temperature to above 700° F., at space velocities of 2.8 to 5.6 lbs. hydrocarbon per hour per lb. of catalyst, 500 p.s.i.g., with 2 lbs. steam per lb. of hydrocarbon feed in obtaining high B.t.u. fuel gas products that contained above 50 vol. percent $CH_4$ with $CO_2$ and $H_2$ as the other main components.

Experimental studies indicated that a high $H_2O$ to $H_2$ ratio localized at inlet parts of the active catalyst bed can cause an increased rate of catalyst deactivation. Deactivation by sintering also results from exposing the active catalyst to heat at elevated temperatures. A localized high hydrocarbon to steam ratio tends to coke formation.

The surface area measurements of the nickel by the hydrogen chemisorption technique and of the total catalyst area by the nitrogen adsorption technique give a sufficiently accurate determination of relative activity of the catalysts. The method for measuring catalyst surface areas known as the B.E.T. method (Emmett, P. H., Advances in Catalysis I, 65 (1948)) is reliable as is also the hydrogen chemisorption technique for nickel areas. The nickel surface area is reported as square meters of the nickel per gram of the total catalyst.

In using a bed of spent catalyst for preconditioning the feed mixture of hydrocarbons and steam, coke (carbon) tends to accumulate on the spent catalyst with lowered deposition on the main catalyst bed, which is located downstream. The distribution of coke deposits in each successive portion of the catalyst beds is somewhat like that of the sulfur from sulfiding. At the same time, the surface area of the catalyst, particularly the active nickel surface-area, is best maintained at lower temperatures. Preconditioning the feed by removal of sulfur and carbon forming components with the additional formation of hydrogen from the feed-steam mixture lowers the rate of catalyst deactivation and thus allows the active catalyst to be operated at lower temperatures for a longer period of time. The deposition of coke and sulfiding account for only part of the loss of activity. The decomposition reaction resulting in carbon formation and the desulfiding are reversible to some extent, but sintering is not reversible under the conditions of reaction. Tests have shown that after a nickel catalyst has been oxidized enough at 700° F. to drastically lower its nickel surface area, treatment with pure hydrogen for a substantial period could not restore much of the surface area.

In using a spent catalyst bed for preconditioning the feed mixture, a substantial buildup of carbon may occur on the spent catalyst, e.g. above 7 wt. percent, while the main active catalyst has a deposition of less than 3 wt. percent. The coke or carbon deposition reaction may be due partly to the presence of hydrocarbon components of feed that undergo coke forming reactions most readily, considering that a typical naphtha feed of principally $C_5$ to $C_8$ paraffins contains some naphthenes, aromatics, and olefins and considering that decomposition reactions can take place to form such varieties of hydrocarbons.

The nickel catalysts described herein as spent result from deactivation of the highly active catalysts which have reached a point where decline of activity on further use becomes rapid. The decline in activity of fresh highly active catalysts is slow for periods of several hundred hours to over a thousand hours of use and then when they become spent their rapid decline in activity shows up by a decrease of more than 25% in gas yield rate, e.g. cubic feet/hour, or similar big drop in conversion, i.e. percent hydrocarbon in feed decomposed to gas products ($CH_4$, $H_2$ and $CO_2$).

Example 2

In a typical run using a fresh highly active K promoted Ni–$Al_2O_3$ (coprecipitated) catalyst under constant conditions of 700° F. inlet temperature, 500 p.s.i.g., 2 lbs. $H_2O$/lb. naphtha feed, at a space velocity of 2.8 lbs. hydrocarbon per hour per lb. catalyst, the run was made for 1016 hours without more than 10% drop in conversion. Then on introducing a feed containing more sulfur (25 p.p.m.), the activity in terms of gas make rate dropped sharply (more than 50%), until a lower sulfur feed (1 to 3 p.p.m.) as obtained by preconditioning with spent catalyst was introduced at initially designated space velocity to continue the run another 87 hours with the activity of the catalyst less than 25% below that at hour 1016. The gas product obtained for over 1000 hours at above 90% conversion had a decomposition represented as follows:

GAS PRODUCT (WATER FREE BASIS)

| Component | Mole percent |
|---|---|
| $CH_4$ | 68.35 |
| $CO_2$ | 20.45 |
| $H_2$ | 10.54 |
| CO | 0.19 |

Inspections of the main reaction bed catalyst show the significant changes.

CATALYST INSPECTIONS

[K promoted Ni–$Al_2O_3$ (coprecipitated) catalyst used 1,278 hours]

| | Fresh | Spent |
|---|---|---|
| Total surface area, m.²/g | 149 | 58 |
| Nickel surface area, m.²/g | 22.8 | 9 |
| Wt. percent C (average) | | 0.36 |
| Wt. percent S (average) | | 0.15 |
| Wt. percent Ni | 45.7 | |

Thus, in general, the total surface area and Ni surface area of the fresh highly active catalyst declines to about 20 to 50% of such areas to form the spent catalyst. The sulfur level of the spent catalyst is very low relative to its capacity for picking up sulfur so that such a spent catalyst is able to be used for preconditioning a considerable amount of hydrocarbon feed with respect to removal of sulfur before the feed mixture enters a reaction zone charged with fresh highly active catalyst to be given a longer life.

Using similar feeds and highly active nickel catalysts, preferably promoted Ni–$Al_2O_3$ and Ni–$SiO_2$ obtained by the coprecipitation technique, the space velocity is increased or contact time is decreased to obtain a hydrogen-rich gas at low hydrocarbon conversion levels, preferably 10 to 40% conversion levels, and the unconverted feed hydrocarbons can be recycled. At such low conversion levels the main reactions are represented by the following equations:

$$C_6H_{14} + 9.6H_2O \rightarrow 6CO + 13H_2 + 3.6H_2O$$

$$CO + H_2O \rightleftharpoons H_2 + CO_2$$

The resulting low conversion level products have the following types of dry gas composition:

| | Mole percent (dry gas basis)[1] |
|---|---|
| $H_2$ | 54.1 |
| $CO_2$ | 21.8 |
| CO | 0.3 |
| $CH_4$ | 23.8 |

[1] Data obtained at 700° F., 350 p.s.i.g.; 2 lbs. $H_2O$/lbs. hydrocarbon at 10% hexane conversion.

These hydrogen forming reactions are mainly endothermic and can take place at low reaction temperatures in the range of 550° to 750° F. preferably with input of heat in addition to the sensible heat of the hydrocarbon feed-steam mixture.

In the process of converting the naphtha hydrocarbons by reaction with steam in the presence of the highly active nickel catalysts, the reaction mixture may be under a pressure of 15 to 1500 p.s.i.g. or higher, and the steam to hydrocarbon ratio may be in the range of 1.5 to 4 lbs. $H_2O$ per lb. of hydrocarbon. The space velocities are controlled to give the desired amount of conversion at a desired temperature level. In the preconditioning zone, the space velocity may be the same as in the main reaction zone, higher, or lower, but the low activity of the catalyst in the preconditioning zone keeps the conversion of the hydrocarbons low. In the use of a typical spent catalyst for preconditioning the feed mixture, the amount of conversion of the hydrocarbons of the feed to gas products tends to become low, e.g. 10% and less, since the preconditioning is preferably carried out at temperatures lower than the reaction temperatures in the bed of highly active catalyst, in which the optimum conversion level for producing a hydrogen-rich gas is near 30% and the optimum conversion level for making methane-rich gas is about 90% or above.

The invention described is claimed as follows:

1. In a process for producing gases containing principally methane, hydrogen, and carbon dioxide by reacting a normally liquid naphtha $C_5$ to $C_8$ paraffin hydrocarbon feed with steam at temperatures of 550° F. to 850° F. and pressures of 15 to 1500 p.s.i.g. using a highly-active catalyst containing nickel interspersed with a member selected from the group consisting of alumina and silica, said catalyst having a nickel surface area of about 20 to 60 m.²/g. of catalyst when freshly prepared and activated with hydrogen, and said catalyst being subject to deactivation by sulfiding contaminants and coking contaminants in the feed, by oxidation, and by sintering, which cause a decline of said nickel surface area and activity, the improvement comprising the following steps:

(a) pretreating the hydrocarbon feed and steam by passing same through a bed of catalyst previously deactivated in said reaction of hydrocarbon feed and steam, but having residual nickel surface area ranging from 20 to 50% of the surface area of said highly active catalyst, whereby sulfiding and coking contaminants are removed from said hydrocarbon feed and steam;

(b) passing the pretreated hydrocarbon feed and steam through a bed of the highly active catalyst at said reaction temperatures and pressures to produce said gases containing principally methane, hydrogen, and carbon dioxide.

2. The process of claim 1 wherein said sulfiding and coking contaminants are removed in step (a) at a temperature in the range of 400 to 700° F. and lower than the reaction temperatures in the bed of highly active catalyst in step (b).

References Cited

UNITED STATES PATENTS

| | | | |
|---|---|---|---|
| 2,110,241 | 3/1938 | Roelen | 252—373 X |
| 2,273,298 | 2/1942 | Szayna | 208—112 |
| 2,401,334 | 6/1946 | Burk et al. | 208—216 X |
| 2,432,644 | 12/1947 | Alther | 208—74 |
| 2,668,101 | 2/1954 | Arnold et al. | 48—214 X |
| 3,061,421 | 10/1962 | Landau et al. | 48—197 |
| 3,106,457 | 10/1963 | Lockerbie et al. | 23—212 |
| 3,119,667 | 1/1964 | McMahon. | |

FOREIGN PATENTS 820,257  9/1959  Great Britain.

JOSEPH SCOVRONEK, *Primary Examiner.*

U.S. Cl. X.R.

23—3, 288; 48—197; 252—459, 466